United States Patent [19]

Il

[11] Patent Number: 4,760,499
[45] Date of Patent: Jul. 26, 1988

[54] ADJUSTABLE AUTOMOBILE HEADLIGHT ASSEMBLY

[76] Inventor: Ryou D. Il, 302-18, Mia 3-dong, Dobong-ku, Seoul 132, Rep. of Korea

[21] Appl. No.: 47,919
[22] PCT Filed: Jul. 18, 1986
[86] PCT No.: PCT/KR86/00014
 § 371 Date: Apr. 30, 1987
 § 102(e) Date: Apr. 30, 1987
[87] PCT Pub. No.: WO87/01662
 PCT Pub. Date: Mar. 26, 1987

[30] Foreign Application Priority Data

Sep. 23, 1985 [KR] Rep. of Korea .......... 1985/12147[U]

[51] Int. Cl.$^4$ .............................................. B60Q 1/06
[52] U.S. Cl. ......................................... 362/61; 362/71; 362/282
[58] Field of Search ................... 362/66, 71, 277, 282

[56] References Cited

U.S. PATENT DOCUMENTS

| 1,104,330 | 7/1914 | Townsend | 362/282 |
| 1,123,938 | 1/1915 | Shaffer | 362/282 |
| 3,614,416 | 10/1971 | Fleury | 362/71 |
| 4,482,939 | 11/1984 | Tishman | |

FOREIGN PATENT DOCUMENTS

| 87984 | 10/1921 | Austria . |
| 138788 | 4/1934 | Austria . |
| 182628 | 9/1952 | Austria . |
| 93110 | 9/1920 | Canada . |
| 0129519 | 12/1984 | European Pat. Off. . |
| 2126329 | 3/1984 | Fed. Rep. of Germany . |
| 1249486 | 10/1971 | France . |

Primary Examiner—Larry I. Schwartz
Attorney, Agent, or Firm—Barnes & Thornburg

[57] ABSTRACT

The present invention relates to an automobile headlight freely adjustable in the upward and downward directions and from side to side, in which a reflex mirror with a lens attached and a cover with pivot suspensions formed in the upper and lower parts and with fixing means with a cover working bar inserted into the outer wall in the rear lower part are fixed by a socket; a cap with a slot and brackets united with a cap working bar formed is axially fixed so as to make a turn upward and downward in the center from both sides (left and right) of the cover; irradiation direction is made adjustable by pivoting the cover within the housing by dint of fixing means together with a steering device; and the effect of safe driving at night is produced by providing the driver with an excellent front—watching ability.

11 Claims, 4 Drawing Sheets

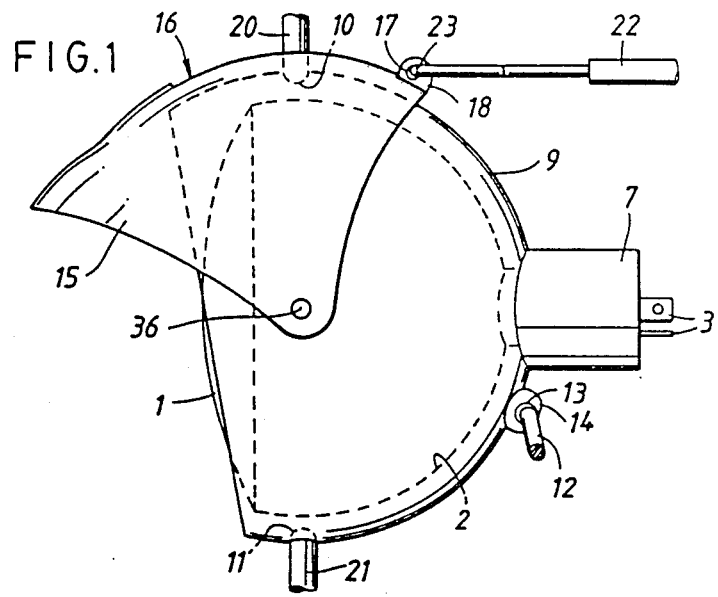
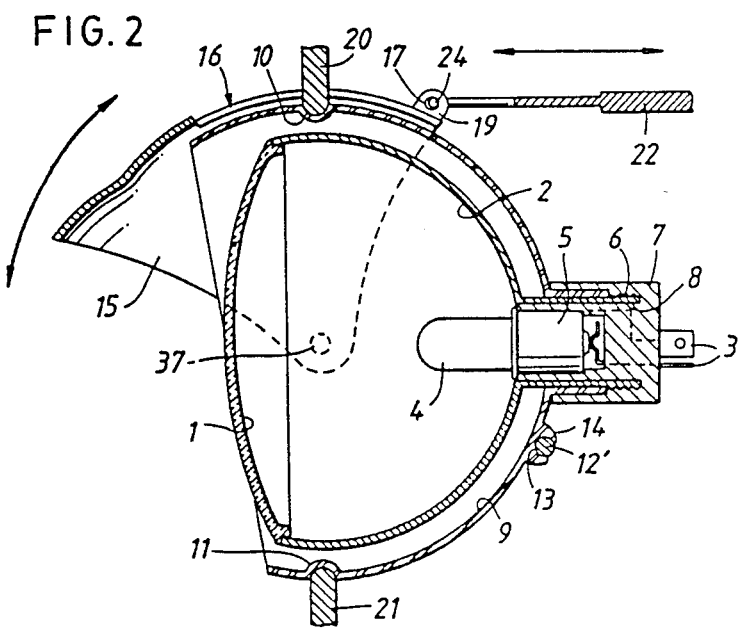

4,760,499

ADJUSTABLE AUTOMOBILE HEADLIGHT ASSEMBLY

TECHNICAL FIELD

The present invention relates to an automobile headlight the irradiation direction of which is freely adjusted upward, downward and from side to side.

BACKGROUND ART

In the case of conventional automobile headlights, there have been headlight assemblies composed of a downward headlight for short distance on the left and an upward headlight for long distance on the right, and a headlight with two types of built-in filaments in an electric bulb for use as one headlight designed to throw a light upward and downward.

Either of these two conventional automobile headlights is fixedly installed in its housing and adjustable only upward and downward, whether it is adjusted by human power or automatically by sensing the illumination of an automobile coming in the opposite direction in an electronic way.

Even when such conventional headlights direct the light downward, it is impossible for it to direct the light on the ground close to a front side of the vehicle due to its fixed degrees of irradiation angle.

The present invention aims to provide a headlight which can quickly throw a light in the direction to which the automobile turns by adjusting its irradiation angle from side to side and can also throw a light on the ground just thereunder when the automobile arrives at the top of a slope by setting its irradiation angle extremely downward.

SUMMARY OF THE INVENTION

An automobile headlight assembly of the present invention includes a housing having pivot means situated inside the housing to define a first axis. A bulb receiver is situated within the housing, the bulb receiver having an open front edge and means coupling the bulb receiver to the pivot defining means. A directing means is coupled to the bulb receiver to permit movement of the bulb receiver about the first axis in a generally horizontal plane. Pin means are provided on the bulb receiver to define a second axis generally orthogonal to the first axis. A unitary adjustable cover is situated inside the housing having a front edge positionable forward of the bulb receiver front edge. The adjustable cover includes means coupling the cover to the pin means on the outside of the bulb receiver. The adjustable cover also includes a slot defined by a pair of edges straddling one of the pivot means defining the first axis adjusting means is coupled to the cover for causing adjustment of the cover position about the second axis.

BRIEF DESCRIPTION OF THE DRAWINGS

FIG. 1 is a side elevation view showing an adjustable automobile headlight assembly according to one embodiment of the present invention.

FIG. 2 is a vertical sectional view of FIG. 1.

BEST MODE FOR CARRYING OUT THE INVENTION

FIG. 1 and FIG. 2 are a side elevation view and a vertical sectional view of an automobile headlight assembly the irradiation direction of which is adjustable according to an embodiment of the present invention.

A terminal(3) is exposed at the rear end of a reflex mirror(2) with a lens(1) inserted into the front side. The base(5) of an electric bulb(4) with a bolt part(8) is combined with a socket(7) and a threaded part(6) formed therein.

A bulb receiver(9), which is open at its front side and at its rear end, includes confronting pivot suspensions(10)(11) in the upper and lower parts and is interlocked with the steering device of an automobile on the outer wall of the bulb receiver on the rear lower part and a socket means(14) is provided with a globular groove(13) into which a ball(12′) on the end of working bar(12) is inserted.

The reflex mirror(2) and bulb receiver(9) will be fixed together under the condition that they are inserted into the inside of a socket(7), as shown in FIG. 2.

Figure 3:
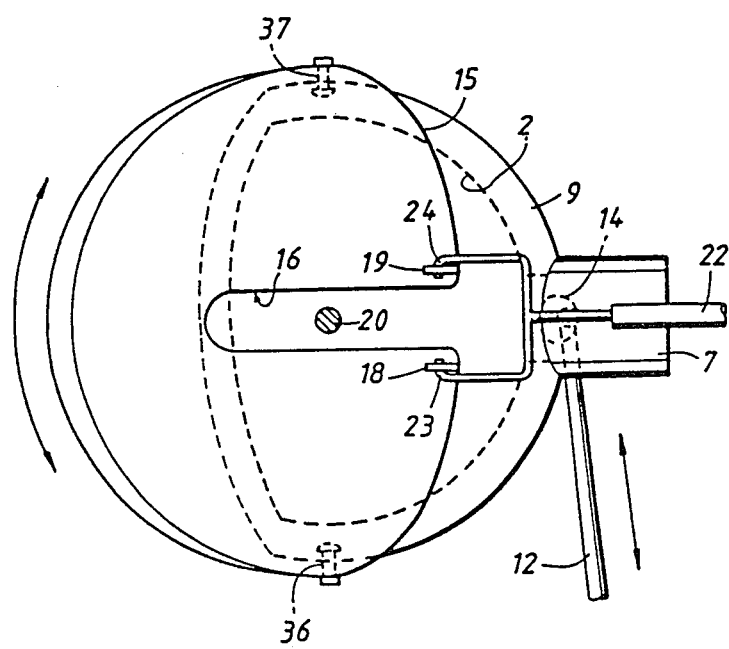
FIG. 3 is a top plan view of FIG. 1.

FIG. 3 is a plan view according of an embodiment of the present invention, which shows adjustable cover(15) fixed by pins (36)(37) to bulb receiver(9) so as to enable cover(15) to turn upward and downward on the bulb receiver(9).

A cover(15) includes in its upper center a slot(16) with its rear side open and brackets(18)(19) provided with a hole(17) at both sides of the open slot(16). An upper pivot(20) is located in the slot(16) and engages with pivot suspensions(10) formed in the upper parts of the bulb receiver(9).

Both bifurcated ends(23)(24) of working bar(22) engage hole(17) of brackets(18)(19) to function as an adjusting means to adjust the position of cover(15) about the axis defined by pins(36)(37).

Figure 4:
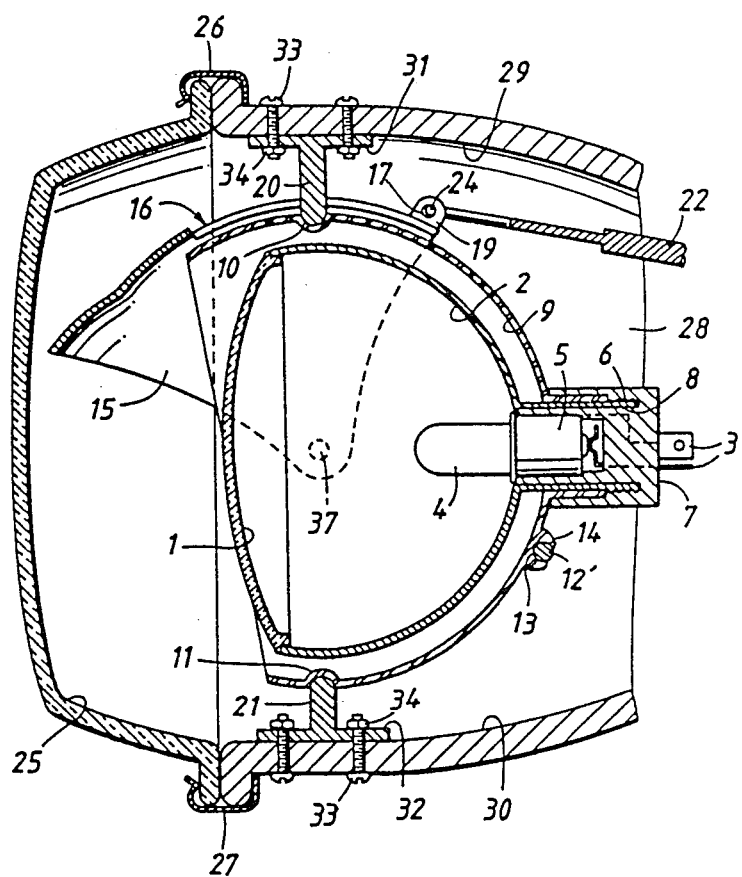
FIG. 4 is a vertical sectional view showing the headlight assembly of FIG. 1 pivoted within its housing.

FIG. 4 is a vertical sectional view showing how a headlight assembly embodied by the present invention is pivoted within a housing(28). Fixing means(31)(32) with pivots(20)(21) are fixed to projectingly on the inner walls(29)(30) in the upper and lower parts of a housing(28). On a front side of the housing a lens(25) is fixed by detachable means(26)(27). Securing means such as a bolt(33) and a nut(34) secure the fixing means to engage bulb receiver (9) with pivot detent suspensions(10)(11) formed respectively in the upper and lower parts thereof to allow pivotal movement from side to side within the housing(28) by means of working bar(12).

Figure 5:
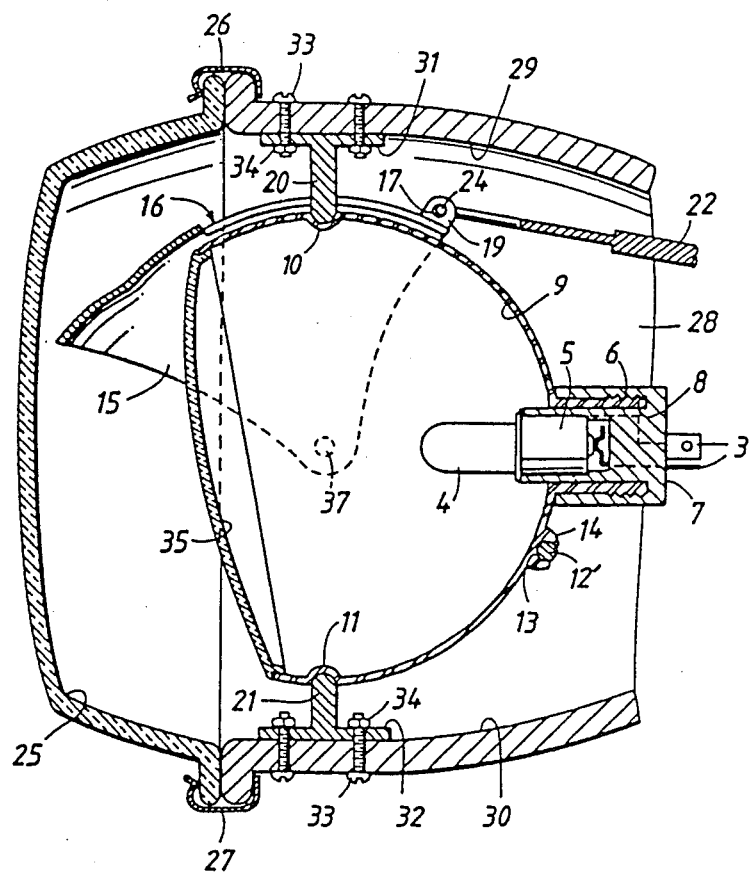
FIG. 5 is a vertical sectional view similar to FIG. 4 showing an alternative embodiment of the present invention wherein the headlight uses the inner surface of the bulb receiver as a reflex mirror.

FIG. 5 is another embodiment of the present invention showing a headlight assembly which uses the inner surface of a bulb receiver as a reflex mirror which is pivoted within the housing. It illustrates a headlight assembly provided with structure, where a reflex layer is formed on the inner surface of a bulb receiver(9) and a separate reflex mirror is omitted by fixing a lens(35) to the open front side of a bulb receiver(9), furnished within the housing(28).

As the present invention is constituted with an adjustable cover(15) fixed axially in the center from both sides (left and right) of the bulb receiver(9) by pins(36)(37) so as to permit the cover turn upward and downward as shown in FIG. 2. The driver can freely adjust the irradiation direction of headlight upward and downward by the upward and downward operation of the cover(15) effected by means of working bar(22) connected to a drive such as a drive cable or a link interlocked with an unillustrated steering device installed underneath the seat.

In addition, as the invention possesses not only a function designed to adjust the irradiation in the upward and downward directions but also bulb receiver(9) is pivoted within the housing(28) by pivot suspensions(10)(11), and pivots(20)(21) of fixing means(31)(32). The bulb receiver is linked with a steering device operated by a steering wheel and can adjust the irradiation of headlight in the left or right direction to which the automobile turns by means of a working bar(12) inserted into the socket means(14) formed on the outer wall in the rear lower part of bulb receiver(9).

INDUSTRIAL APPLICABILITY

The automobile headlight assembly of the present invention is designed to adjust its irradiation direction to the front in the direction to which the automobile driver wants to make a turn by adjusting its irradiation direction together with a steering device. In particular, the invention has the effect of safely driving the automobile at night by providing the driver with the ability to see directly in front of the vehicle through downward adjustment of the irradiation direction of the headlights when the vehicle arrives at the top of a slope on which the vehicle is running.

I claim:

1. An automobile headlight assembly comprising: a housing, the housing including pivot means situated inside the housing defining a first axis; a bulb receiver situated within the housing, the bulb receiver having an open front edge and including means coupling the bulb receiver to the pivot defining means, directing means coupled to the bulb receiver for causing movement of the bulb receiver about the first axis, and pin means defining a second axis generally orthogonal to the first axis; and a unitary adjustable cover situated inside the housing and having a front edge positionable forward of the bulb receiver front edge, the cover including means coupling the cover to the pin means on the outside of the bulb receiver, a slot defined by a pair of edges straddling said pivot means defining the first axis, and adjusting means coupled to the cover for causing adjustment of the cover position about the second axis.

2. The automobile headlight assembly of claim 1 wherein the bulb receiver includes a mirrored inside surface.

3. The automobile headlight assembly of claim 1 further comprising a separate reflex mirror received inside the bulb receiver and a socket coupling the reflex mirror to the bulb receiver.

4. The automobile headlight assembly of claim 3 wherein the separate reflex mirror includes a lens coupled to a front portion thereof.

5. The automobile headlight assembly of claim 1 wherein the bulb receiver further comprises a lens attached to said open front edge thereof.

6. The automobile headlight assembly of claim 1 wherein the directing means comprises a socket situated on an outside lower rear surface of the bulb receiver and a rod element coupled to the socket.

7. The automobile headlight assembly of claim 1 wherein the adjusting means further comprises a pair of brackets situated on opposite sides of said slot, and a bar having a bifurcated end coupled to the brackets.

8. The automobile headlight assembly of claim 1 wherein the cover includes a light reflective inside surface.

9. The automobile headlight assembly of claim 1 wherein the housing further comprises a lens enclosing the bulb receiver and adjustable cover.

10. The automobile headlight assembly of claim 1 wherein said pivot means comprises a pair of fixing means secured to an upper and lower inner surface of the housing, each fixing means including a projecting member directed toward the other fixing means of the pair.

11. The automobile headlight assembly of claim 10 wherein said means coupling the bulb receiver to the pivot means comprises detents engaging the fixing means projecting members.

* * * * *